G. W. BATCHELL & R. C. SCHWENCK.
HEADLIGHT FOR AUTOMOBILES.
APPLICATION FILED MAY 2, 1916.
1,271,265.
Patented July 2, 1918.
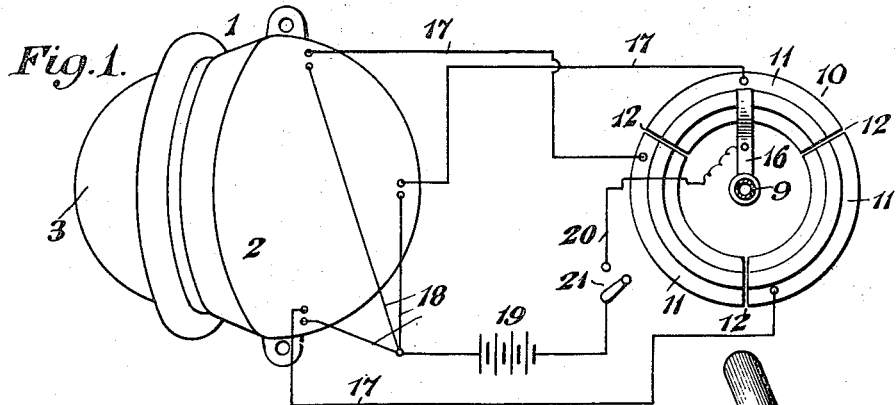
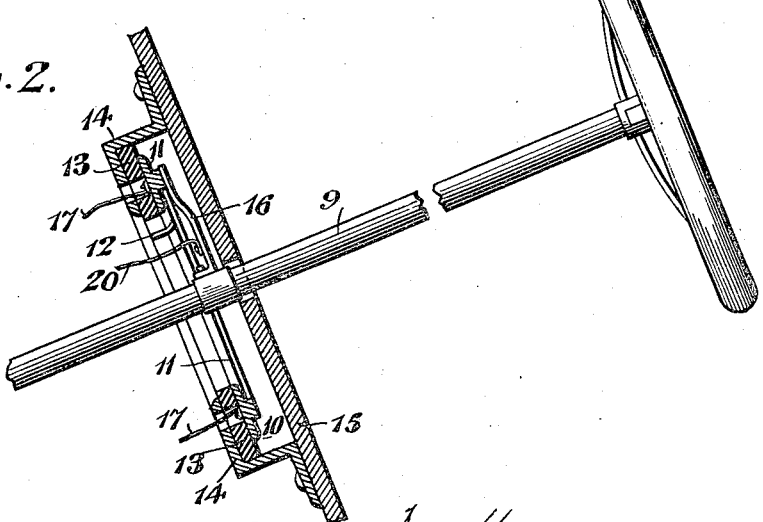
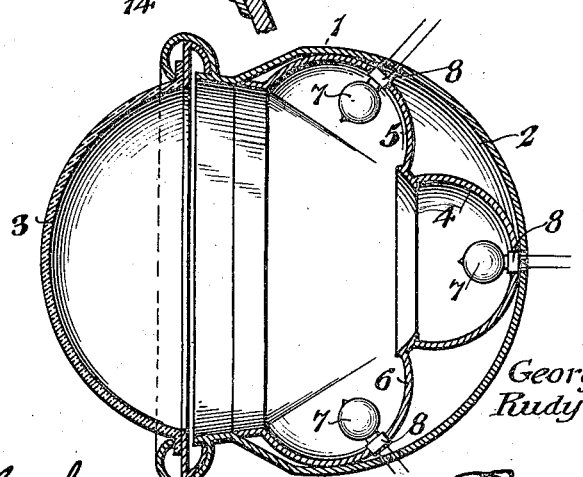
George W. Batchell,
Rudy C. Schwenck,
INVENTORS
WITNESSES
BY
ATTORNEY

UNITED STATES PATENT OFFICE.

GEORGE W. BATCHELL, OF CINCINNATI, OHIO, AND RUDY C. SCHWENCK, OF HUNTINGTON, WEST VIRGINIA.

HEADLIGHT FOR AUTOMOBILES.

1,271,265.     Specification of Letters Patent.     Patented July 2, 1918.

Application filed May 2, 1916. Serial No. 94,962.

*To all whom it may concern:*

Be it known that we, GEORGE W. BATCHELL and RUDY C. SCHWENCK, citizens of the United States, residing, respectively, at Cincinnati, county of Hamilton, State of Ohio, and at Huntington, in the county of Cabell and State of West Virginia, have invented a new and useful Headlight for Automobiles, of which the following is a specification.

This invention has reference to headlights for automobiles, and its object is to provide a headlight which may remain in fixed relation to the automobile but cause a beam of light to be thrown in the direction in which the automobile is traveling, whether such direction be straight ahead or to either side of a straight ahead line.

In accordance with the present invention the headlight is provided with three sources of light, one being central and the others being arranged on opposite sides of the central light with each source of light provided with a reflector individual thereto, and with the reflectors in suitable angular relation one to the other to cause the central reflector to direct a beam of light straight ahead and the side reflectors to direct beams of light to one side or the other, as the case may be, the headlight having a single front glass for preventing access of dust or dirt to the interior of the headlight. In conjunction with the headlight, which in accordance with the present invention is equipped with electric bulbs, a switch arrangement is so associated with the steering post that the electric bulbs become energized in accordance with the direction of travel of the vehicle and an illuminating beam of light is directed ahead of the vehicle in line with the course of the vehicle whether such course be straight ahead or to one side or the other, as when the vehicle is making a turn.

The invention will be best understood from a consideration of the following detailed description taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a view more or less diagrammatically showing the invention.

Fig. 2 is an elevation of the steering wheel and stem with electric switch connections in diametric section.

Fig. 3 is a longitudinal diametric section of the headlight, taken in a plane which is substantially horizontal in an installed headlight.

Referring to the drawings there is shown a headlight 1 provided with a casing 2 of suitable shape carrying at the front a glass 3 either of partially spherical shape, as shown, or any other suitable shape. This glass need not be of magnifying or bull's eye form, but may be either a simple flat glass, such as is frequently used in automobile headlights, or may be more or less convex, as shown, this also being a form of headlight glass in common use.

Within the casing or shell 2 there is a trifoliate group of reflectors 4, 5, 6, respectively, of substantially equal size and each having lodged therein an electric lamp bulb 7 carried by a suitable socket 8. Each reflector with its lamp is so arranged as to throw a beam of light made up of approximately parallel or somewhat divergent rays. The reflector 4 is in the longitudinal axis of the casing and is designed to direct the rays from the lamp 7 straight ahead through the central portion of the glass 3, while the reflectors 5 and 6 direct similar beams of light in angular relation to the longitudinal axis of the headlight structure, so that a beam of light directed by the reflector 5 will pass through the glass 3 near one side, while the beam of light directed by the reflector 6 will pass through the glass 3 near the other side thereof, the beams being each in angular traversing relation to the longitudinal central axis of the headlight and crossing said axis at the same point within the casing. The point where the three reflector axes cross each other or intersect is substantially the center of curvature of the front glass 3.

Mounted in suitable relation to the steering wheel stem of the automobile, which stem is indicated at 9, is a sectional switch 10, provided with a circular series of conducting segments 11 which may be spaced apart at their meeting ends to form air gaps 12, or may be otherwise insulated one from the other. To support the segments 11 there is shown in the drawings an insulating ring 13 mounted in an annular bracket 14 fast to the dash 15 of the automobile, preferably on the forward face thereof, the bracket being concentric with the stem 9. Fast to the stem 9 is a conducting arm 16 arranged to sweep around the segments 11 in contact therewith. Each segment 11 is connected by a conductor 17 to one side of a respective one of the lamps 7, while the other sides of all the lamps may be connected by conductors 18 to one terminal of a battery 19 or other suitable source of electric energy. The other terminal of the battery is connected by a conductor 20 to the arm 16 and may include a switch 21, so that the lighting circuit may be cut out when not needed.

The arrangement is such that when the automobile is moving straight ahead, the lamp in the reflector 4 only is energized, and consequently the roadway directly ahead of the automobile and along the path the automobile is to travel is illuminated. If the automobile be turned to one side or the other of the straight path, as, for instance, in going around a corner, the lamp in the appropriate one of the reflectors 5 or 6, as the case may be, is illuminated, and a beam of light is directed at an angle to the longitudinal center line of the vehicle, thus illuminating toward that side of the vehicle toward which the turn is being made. The brush or switch arm 16 is wide enough to bridge the gaps 12, so that one lamp does not go out before the other is lighted, and consequently there is no period of darkness on making the turn.

The structure provides for illuminating the roadway to one side of the vehicle on making turns or to illuminate the roadway straight ahead of the vehicle when pursuing a straight course without any complication of mechanism and without any necessity of turning the headlight to one side or the other.

The headlight permits the use of parabolic and like reflectors without any interference from neighboring reflectors of the beam of light projected from any one of the reflectors. The interior of the headlight is roomy and without impediment to any desired spread of the light, as might occur with multi-headlights where each unit of the headlight is separated from the neighboring ones by division walls reaching to the front of the headlight casing. The roomy interior of the headlight is obtained by having the reflectors arranged wholly at the back of the interior of the casing, wherefore the interior of the casing is in effect a single chamber which may be traversed in any direction by the beams of light. Those reflectors to the side of the central reflector are so arranged that their beams of light cross the longitudinal center line of the headlight before emerging from the front of the headlight.

What is claimed is:—

1. A headlight structure for vehicles, comprising a casing having a mouth portion for the emission of light, and a trifoliate group of substantially equisized reflectors within and all directed toward the mouth of the casing, the middle reflector being in the longitudinal axis of the casing and more distant from the mouth of the casing than the other reflectors, and said other reflectors being located on opposite sides of the first-named reflector, and all the reflectors having their longitudinal axes crossing or intersecting within the casing close to the mouth thereof.

2. A headlight structure for vehicle, comprising a casing having a mouth portion for the emission of light, and a trifoliate group of substantially equisized reflectors within and all directed toward the mouth of the casing, the middle reflector being in the longitudinal axis of the casing and more distant from the mouth of the casing than the other reflectors, and said other reflectors being located on opposite sides of the first-named reflector, and all the reflectors having their longitudinal axes crossing or intersecting within the casing close to the mouth thereof, said casing being also provided with a front glass of partly spherical shape and when in place on the casing having its center of curvature substantially coincident with the point of crossing of the longitudinal axes of the reflectors.

In testimony that we claim the foregoing as our own, we have hereto affixed our signatures in the presence of two witnesses.

GEORGE W. BATCHELL.
RUDY C. SCHWENCK.

Witnesses:
HARRY M. DAVIS,
E. J. SCULLY.